(12) United States Patent
Ito et al.

(10) Patent No.: US 8,255,959 B2
(45) Date of Patent: Aug. 28, 2012

(54) CONTENT SUSPENSION AND RESUMPTION METHOD AND APPARATUS

(75) Inventors: Hiroyasu Ito, Tokyo (JP); Takeshi Toyama, Hiratsuka (JP); Makoto Kobayashi, Kawasaki (JP); Kyohei Inukai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1464 days.

(21) Appl. No.: 11/467,624

(22) Filed: Aug. 28, 2006

(65) Prior Publication Data

US 2007/0047902 A1 Mar. 1, 2007

(30) Foreign Application Priority Data

Aug. 30, 2005 (JP) ................................. 2005-249946

(51) Int. Cl.
*H04N 7/18* (2006.01)
(52) U.S. Cl. ............... 725/78; 725/88; 725/91; 725/100
(58) Field of Classification Search ............... 725/82, 725/78, 86–104; 726/5–9, 26–31
See application file for complete search history.

(56) References Cited

U.S. PATENT DOCUMENTS

| 6,064,380 | A | 5/2000 | Swenson et al. | |
|---|---|---|---|---|
| 2002/0104092 | A1 | 8/2002 | Arai et al. | 725/87 |
| 2003/0200458 | A1* | 10/2003 | Hori et al. | 713/200 |
| 2004/0073610 | A1* | 4/2004 | Terada et al. | 709/203 |
| 2005/0027740 | A1 | 2/2005 | Moritani et al. | |
| 2005/0055352 | A1 | 3/2005 | White et al. | |
| 2005/0094031 | A1* | 5/2005 | Tecot et al. | 348/473 |
| 2005/0251835 | A1* | 11/2005 | Scott et al. | 725/88 |
| 2006/0120690 | A1 | 6/2006 | Park | |
| 2006/0140067 | A1 | 6/2006 | Kizuki et al. | |
| 2007/0047909 | A1* | 3/2007 | Toyama et al. | 386/95 |
| 2007/0067808 | A1* | 3/2007 | DaCosta | 725/62 |
| 2007/0130610 | A1* | 6/2007 | Aarnio et al. | 725/134 |

FOREIGN PATENT DOCUMENTS

| JP | 2002-44586 | | 2/2002 |
|---|---|---|---|
| JP | 2002-232861 | | 8/2002 |
| JP | 2003-018576 | A | 1/2003 |
| JP | 2004-128597 | A | 4/2004 |
| JP | 2005-045510 | A | 2/2005 |
| JP | 2005-65214 | | 3/2005 |
| JP | 2005-151445 | A | 6/2005 |
| JP | 2006-319443 | A | 11/2006 |

\* cited by examiner

*Primary Examiner* — Nicholas Corbo
(74) *Attorney, Agent, or Firm* — Fitzpatrick, Cella, Harper & Scinto

(57) ABSTRACT

A first playback apparatus instructs a server apparatus to suspend playback of content, and the first playback apparatus stores identification information of the content for which suspension of playback was instructed and suspension information indicating the location at which playback of content was suspended. In response to a request from a second playback apparatus, the first playback apparatus presents the second playback apparatus with the stored suspension information, and the second playback apparatus selects the content, which is to be played back, in accordance with the suspension information presented.

9 Claims, 16 Drawing Sheets

FIG. 3

| CONTENT ID | TITLE | RECORDING DATE | RECORDING TIME |
|---|---|---|---|
| 001 | TITLE 1 | 2005/04/01 | 1:00' 00" |
| 002 | TITLE 2 | 2005/04/02 | 2:00' 00" |

CONTENT DATA WHOSE CONTENT ID IS 001

CONTENT DATA WHOSE CONTENT ID IS 002

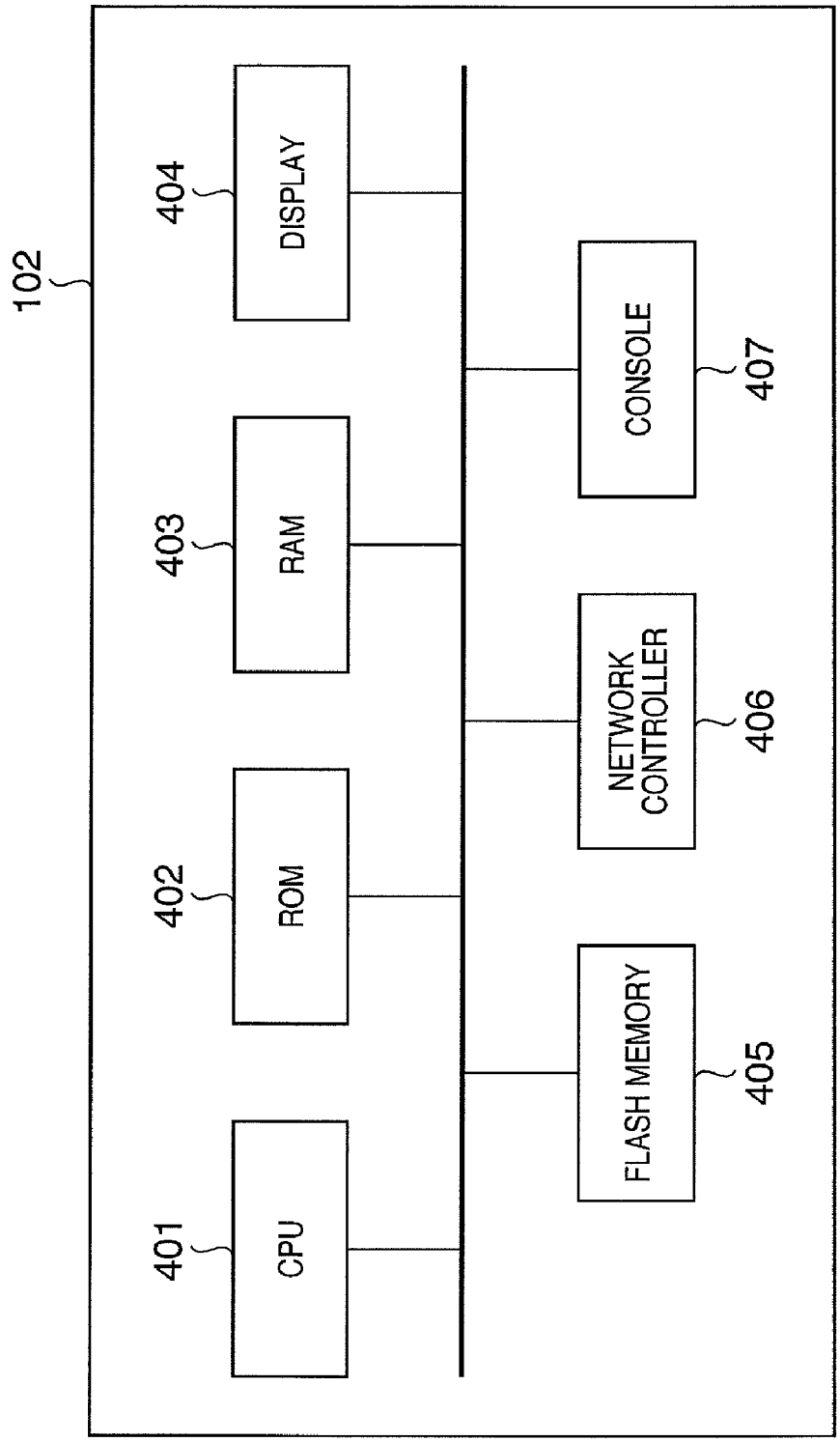

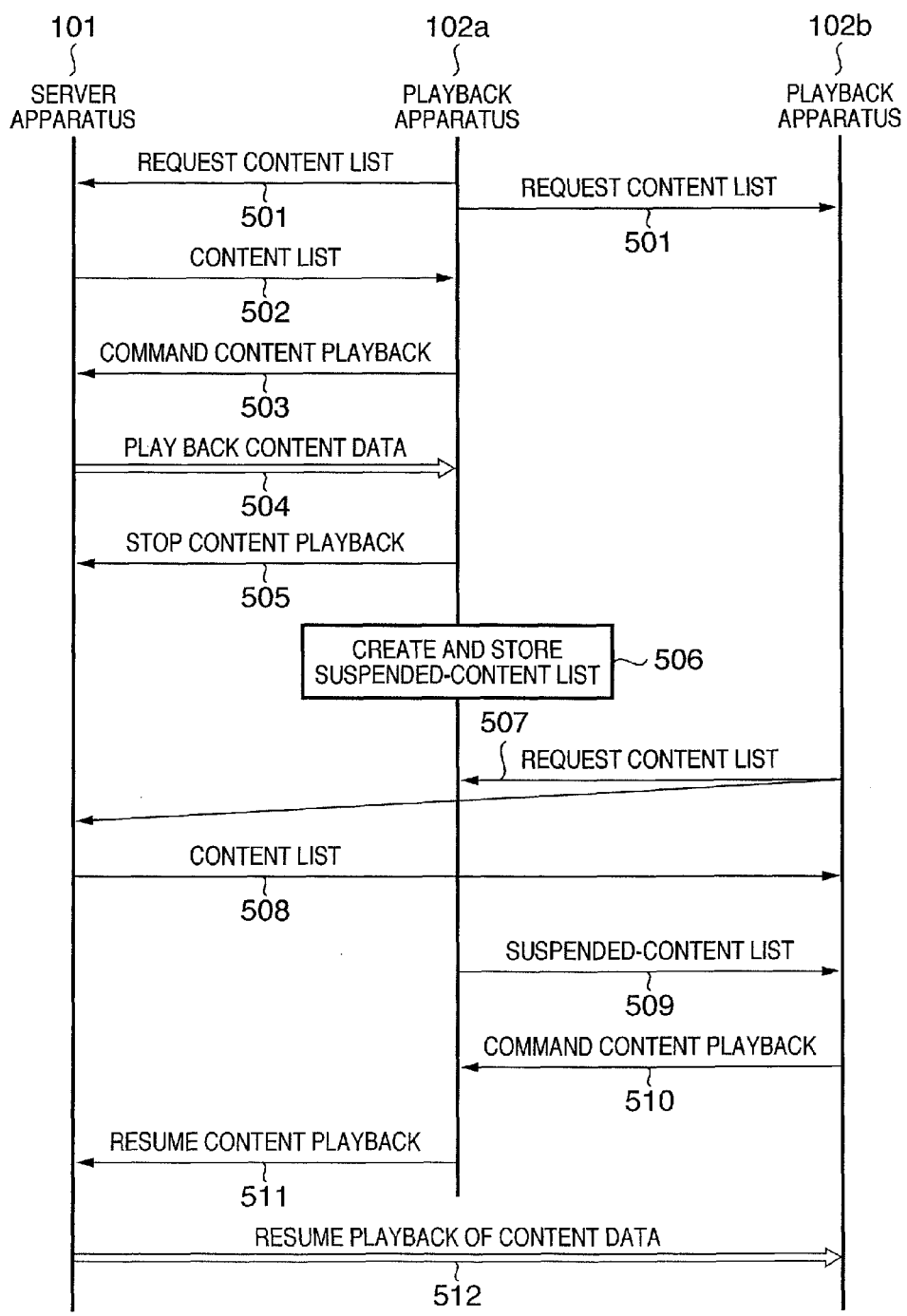

FIG. 6A
| CONTENT-LIST REQUEST |
|---|
FIG. 6B
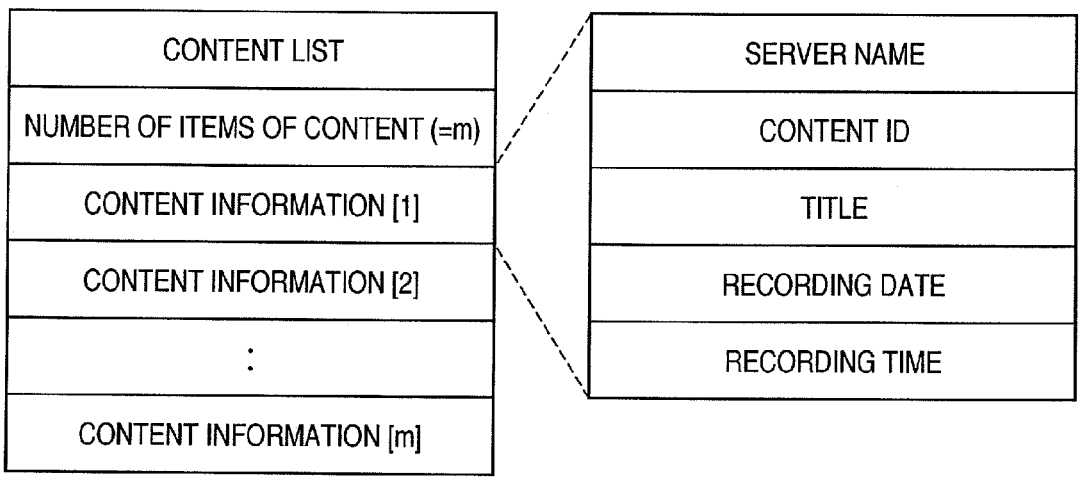
FIG. 6C
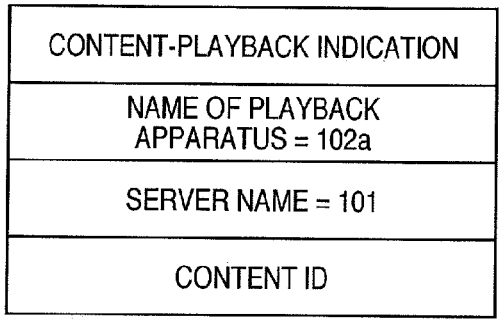
FIG. 6D
| CONTENT-PLAYBACK STOP |
|---|
| CONTENT ID |

FIG. 7

| SERVER NAME | CONTENT ID | TITLE | RECORDING DATE | RECORDING TIME | SUSPENSION DATE | SUSPENSION LOCATION |
|---|---|---|---|---|---|---|
| SERVER 101 | 001 | TITLE 1 | 2005/04/01 | 1:00' 00" | 2005/04/02 | 0:10' 00" |
| SERVER 101 | 002 | TITLE 2 | 2005/04/02 | 2:00' 00" | 2005/04/02 | 0:20' 00" |

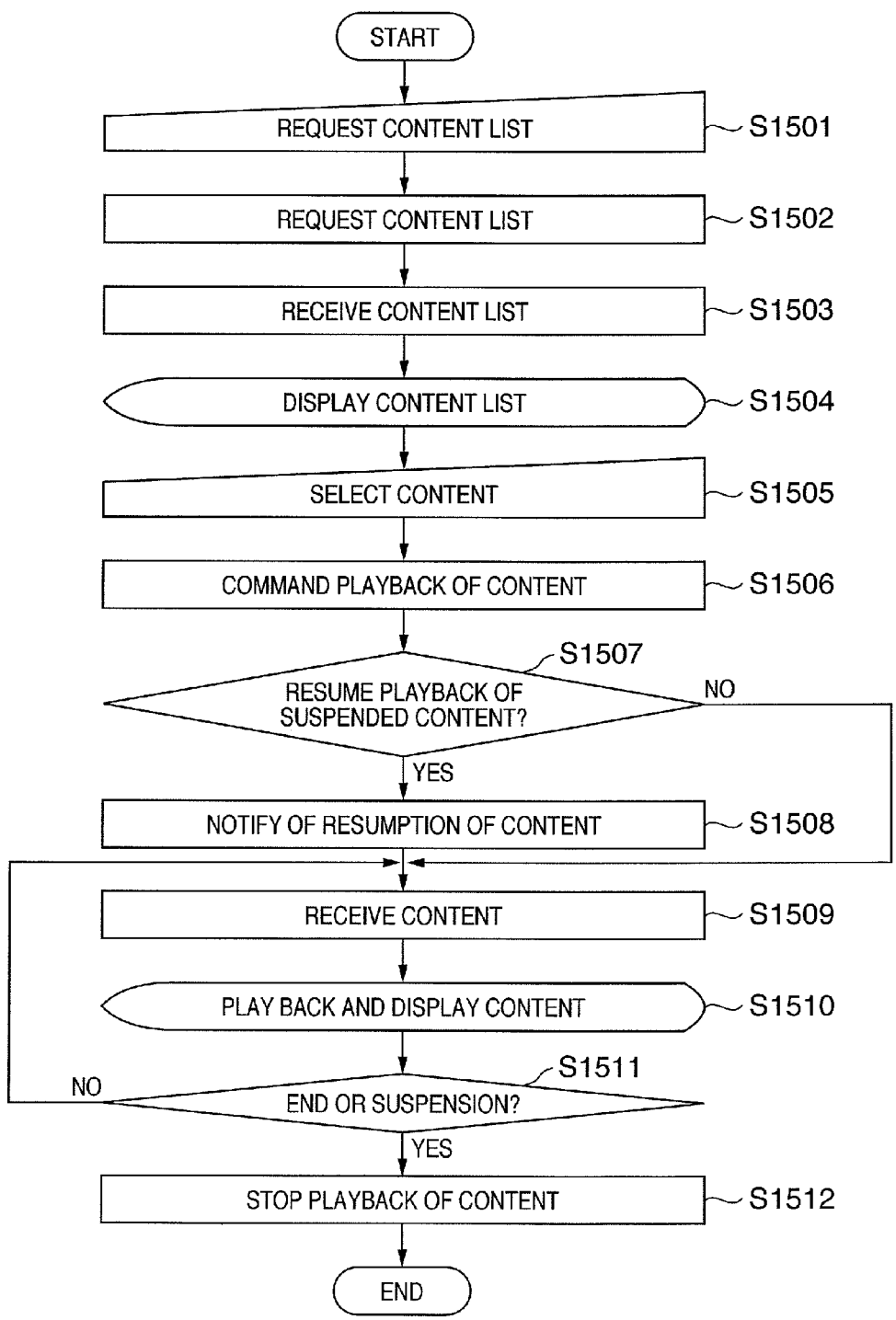

CONTENT SUSPENSION AND RESUMPTION METHOD AND APPARATUS

BACKGROUND OF THE INVENTION

1. Field of the Invention

The present invention relates to a content playback method and apparatus in a system in which a server apparatus for storing content and first and second playback apparatuses for playing back content that has been stored in the server apparatus are connected via a network.

2. Description of the Related Art

In systems disclosed heretofore, content that has been stored in a server apparatus such as a video server is played back by a playback apparatus connected via a network. Playback can be suspended and then resumed subsequently from the location at which playback was suspended. At such time, a suspension location for the purpose of content playback is stored for every user and every item of content. When playback operation is to be resumed, the content is played back from the stored suspension location, thereby implementing resumption of playback for each of a plurality of users. For example, Prior Art Document 1 (Japanese Patent Application Laid-Open No. 2002-232861) and Prior Art Document 2 (US Published Application No. 2002104092: Japanese Patent Application Laid-Open No. 2005-065214).

Prior Art Document 1 discloses a technique in which user registration is performed in advance and playback is resumed from the suspension location in response to a playback request from the user who specified suspension.

Prior Art Document 2 discloses a technique in which the ID of a receiving terminal that has issued a playback suspension command is stored by a server. In response to a playback request from the receiving terminal that matches the ID, playback from the suspension location is performed.

However, in a conventional apparatus in which playback is resumed only when there is a playback request from a specific user, a troublesome preliminary user registration operation must be performed before the system and apparatus are used. For example, with a system or apparatus premised on user registration in advance, such as a personal computer, registration is not that troublesome. However, in the case of household appliances such as a media player used upon being connected to a TV, user registration involves some labor. As this is a troublesome operation, users would be pleased if the same effects could be achieved without the need for user registration processing.

Further, in a conventional apparatus in which playback is resumed only when there is a playback request from the same terminal, there is no labor involving user registration as mentioned above but, on the other hand, if the terminal is not the same terminal, playback cannot be resumed. For example, it is not possible to enjoy content part of the way on a TV in one's living room and then resume enjoyment of the content on a TV in one's bedroom.

SUMMARY OF THE INVENTION

An object of the present invention is to solve the aforementioned problems of the prior art and make it possible to resume playback from a playback apparatus that is different from a playback apparatus that issued a playback suspension command, while reducing labor involved in advance user registration.

According to an aspect of the present invention, the foregoing object is attained by providing a content playback method in a system in which a server apparatus for storing content and first and second playback apparatuses for playing back content that has been stored in the server apparatus are connected via a network, the method comprising the steps of: the first playback apparatus instructing the server apparatus to suspend content playback; the first playback apparatus storing at least identification information for identifying content for which suspension of playback has been instructed at the instructing step, and suspension information indicating location at which playback of the content has been suspended; the first playback apparatus presenting the second playback apparatus with the suspension information in response to a request from the second playback apparatus; and the second playback apparatus selecting content played back based upon the suspension information presented at the presenting step.

According to an aspect of the present invention, the foregoing object is attained by providing a playback apparatus in a system in which a server apparatus for storing content and a plurality of playback apparatuses for playing back content that has been stored in the server apparatus are connected via a network, the apparatus comprising: a suspension command unit adapted to command the server apparatus to suspend content playback; a suspension-information storage unit adapted to store at least identification information for identifying content for which suspension of playback has been instructed by the suspension instructing unit, and suspension information indicating location at which playback of the content has been suspended; and a suspension-information presenting unit adapted to present another playback apparatus with the suspension information in response to a request from this other playback apparatus.

According to an aspect of the present invention, the foregoing object is attained by providing a playback apparatus in a system in which a server apparatus for storing content and a plurality of playback apparatuses for playing back content that has been stored in the server apparatus are connected via a network, the apparatus comprising: a playback requesting unit adapted to request playback of the content; a suspension-information receiving unit adapted to receive identification information, which is for identifying content for which suspension of playback has been instructed by another playback apparatus, and suspension information indicating location at which playback of the content has been suspended, from the other playback apparatus in response to the request from the playback requesting unit; and a selecting unit adapted to select content played back, based upon the suspension information received by the suspension-information receiving unit.

Further features of the present invention will become apparent from the following description of exemplary embodiments with reference to attached drawings.

BRIEF DESCRIPTION OF THE DRAWINGS

FIG. 3 is a diagram illustrating an example of data stored on a hard disk;

FIG. 4 is a block diagram illustrating an example of the structure of a playback apparatus;

FIG. 5 is a diagram illustrating a sequence in a first embodiment in which playback of content is suspended and then playback is subsequently resumed by another playback apparatus;

FIGS. 6A to 6G are diagrams illustrating an example of commands sent and received between the server apparatus and playback apparatus;

FIG. 7 is a diagram illustrating an example of the composition of a suspended-content list;

FIG. 15 is a flowchart illustrating the operation of a playback apparatus according to the second embodiment.

DESCRIPTION OF THE EMBODIMENTS

Preferred embodiments for practicing the present invention will now be described in detail with reference to the drawings.

First Embodiment

Figure 1:
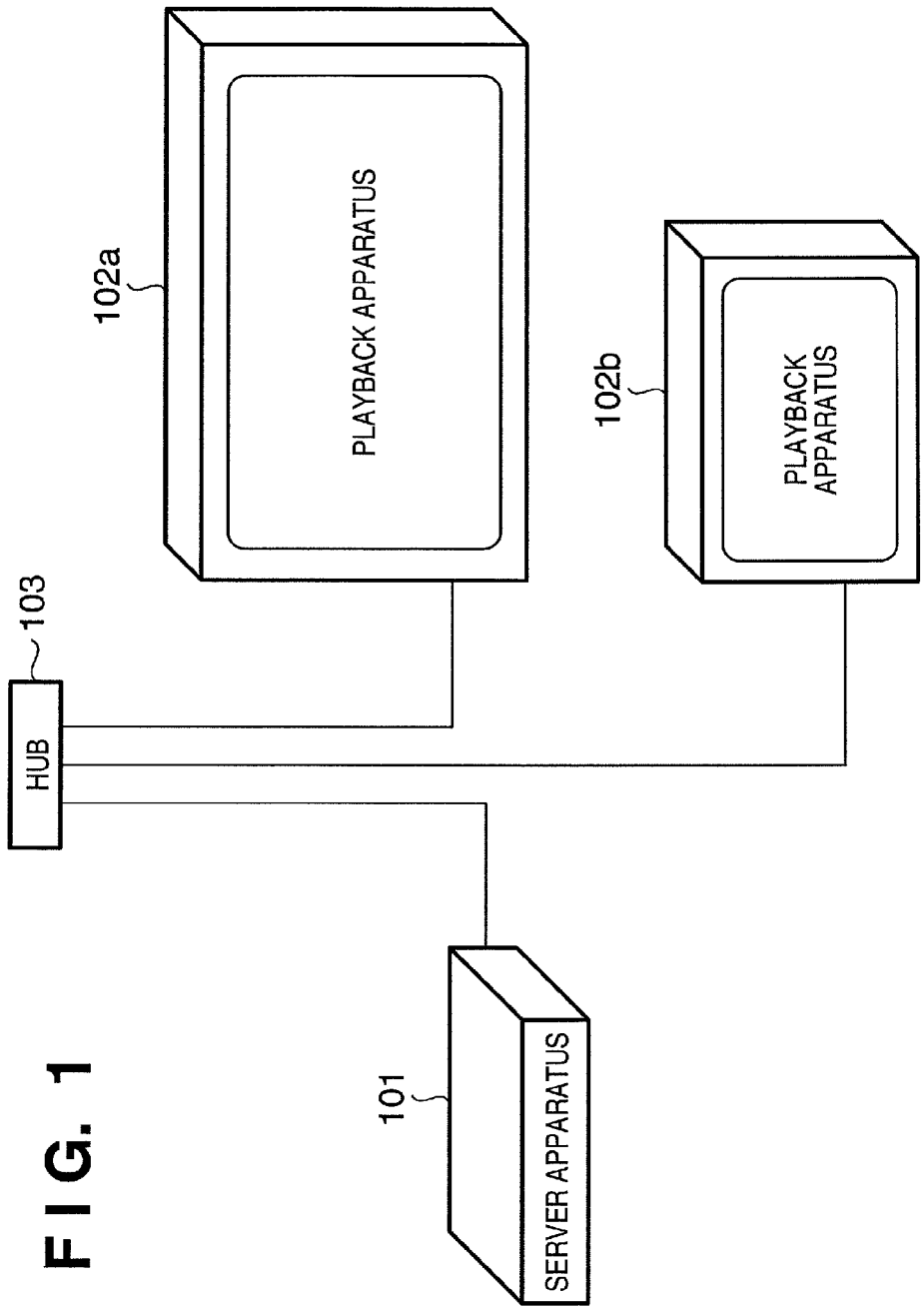
FIG. 1 is a diagram illustrating an example of the configuration of a system according to a first embodiment of the present invention.

FIG. 1 is a diagram illustrating an example of the configuration of a system according to a first embodiment of the present invention. As illustrated in FIG. 1, a server apparatus 101 and two playback apparatuses 102a, 102b have been connected to a network line via a network hub (HUB) 103. Although two playback apparatuses are shown in the example of FIG. 1, it goes without saying that the present invention is applicable also to a case where three or more playback apparatuses are connected.

Figure 2:
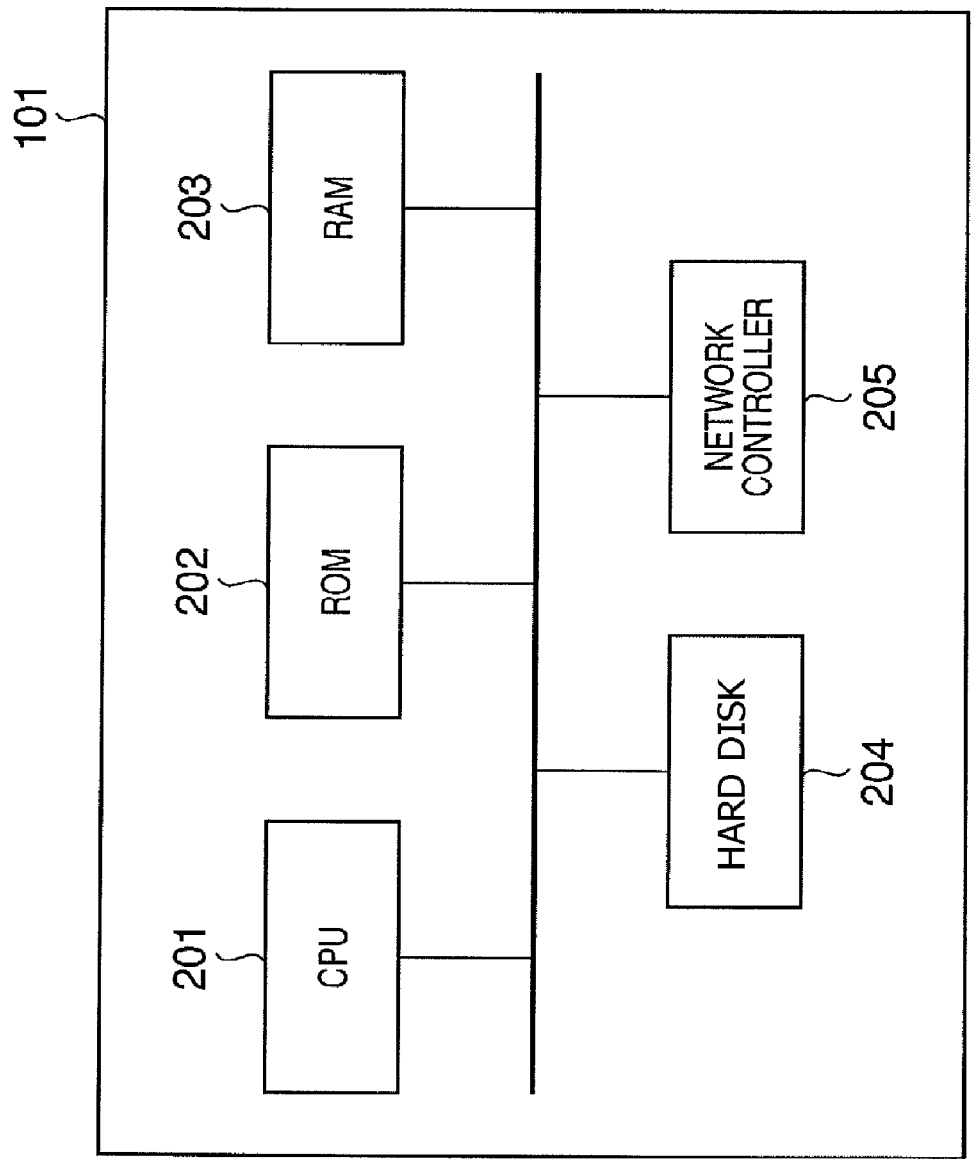
FIG. 2 is a block diagram illustrating an example of the structure of a server apparatus.

The structure of the server apparatus 101 will be described with reference to the block diagram of FIG. 2. As shown in FIG. 2, the server apparatus 101 includes a CPU 201 for controlling the overall server apparatus 101; a ROM 202 for storing programs and parameters that do not require change; a RAM 203 for storing programs and data temporarily; a hard disk 204 for storing content data and a content list; and a network controller 205 for making a connection to a network line such as a LAN (Local Area Network).

The data stored on the hard disk 204 will be described with reference to FIG. 3. A case where video data is stored as content data will be described in the first embodiment.

As shown in FIG. 3, there is a list 301 of content data stored on the hard disk 204. The list 301 comprises content ID for identifying content data; content title; date at which content data has been recorded; and content-data recording time. Content data 302, 303 is correlated with the content list 301 by content IDs. In the example of FIG. 3, a case is illustrated in which two items of content data have been stored, namely the content data 302 whose content ID is 001 and the content data 303 whose content ID is 002.

Next, the structure of the playback apparatus 102 will be described with reference to the block diagram of FIG. 4. As shown in FIG. 4, the playback apparatus 102 includes a CPU 401 for controlling the overall playback apparatus 102; a ROM 402 for storing programs and parameters that do not require change; a RAM 403 for storing programs and data temporarily; a display unit 404 for displaying data held by the playback apparatus 102 and content data that has been supplied; a flash memory 405 for storing information relating to suspension of playback of content data; a network controller 406 for making a connection to a network such as a LAN; and a console 407 for accepting user operation and inputting data.

Described next will be a sequence through which content that has been stored in the server apparatus 101 is played back part of the way and then suspended by a playback apparatus 102a, after which a playback apparatus 102b resumes playback of the content from the location at which playback was suspended. This will be described with reference to a sequence illustrated in FIG. 5 and command lists shown in FIGS. 6A to 6G. It should be noted that the operation of the server apparatus 101 and playback apparatus 102 will be described in further detail later with reference to the flowcharts shown in FIGS. 8 to 11.

FIG. 5 is a diagram illustrating a sequence in the first embodiment in which playback of content is suspended and then playback is subsequently resumed by another playback apparatus. First, the playback apparatus 102a transmits a content-list request command (501) to the server apparatus 101 and the playback apparatus 102b. FIG. 6A illustrates an example of a content-list request command.

Upon receiving the content-list request command from the playback apparatus 102a, the server apparatus 101 refers to its own content list 301 and transmits a content-list command (502) to the playback apparatus 102a. FIG. 6B illustrates an example of a content-list command. This command is composed of a command code indicative of the content list, number of items of content information contained in the command, and content information corresponding to the number of items of content information. Each item of content information is composed of a server name storing content, content ID for identifying the content, content title, recording date and recording time.

It should be noted that since the playback apparatus 102b does not possess information relating to content for playback, it does not transmit a content-list command in response the content-list request command received from the playback apparatus 102a.

Upon receiving the content-list command from the server apparatus 101, the playback apparatus 102a selects the content desired to be played back from content information contained in the command. The playback apparatus 102a then sends the server apparatus 101 a content-playback indication command that indicates playback of the selected content (503). FIG. 6C illustrates an example of the content-playback indication command. This command is composed of a command code indicative of the content-playback indication, name of the playback apparatus for playing back content, name of the server storing the content, and content ID for identifying the content.

Upon receiving the content-playback indication command from the playback apparatus 102a, the server apparatus 101 plays back the content whose playback is indicated by the content ID (504). Then, in order to suspend playback of the content by the playback apparatus 102a, the playback apparatus 102a transmits a content-playback stop command to the server apparatus 101 (505).

As a result, the server apparatus 101 halts playback of the content based upon the command received from the playback apparatus 102a. FIG. 6D illustrates an example of the content-playback stop command. This command is composed of a command code indicating stopping of content playback, and content ID for identifying this content. At this time the playback apparatus 102a creates information (suspended-content list 701 shown in FIG. 7) relating to content whose playback has been suspended and stores this information in the flash memory 405 (506).

The list 701 of content that has been suspended contains the name of the server that is the source of storage, content ID for identification, title, recorded date, recording time, date on which suspension of playback was indicated and location at which playback was suspended. In the example depicted in FIG. 7, a list comprising two items of suspended-content information, namely that of content IDs 001 and 002, has been stored.

Reference will again be had to the sequence shown in FIG. 5 to continue the description. First, in a case where the playback apparatus 102b resumes playback of content, the playback apparatus 102b transmits a content-list request command (507) to the server apparatus 101 and playback apparatus 102a. On the other hand, the server apparatus 101 refers to its own content list 301 and transmits a content-list command (508). Further, upon receiving the content-list request command, the playback apparatus 102a refers to the suspended-content list 701 stored in the flash memory 405 and transmits a suspended-content list command (509).

Figure 6E:
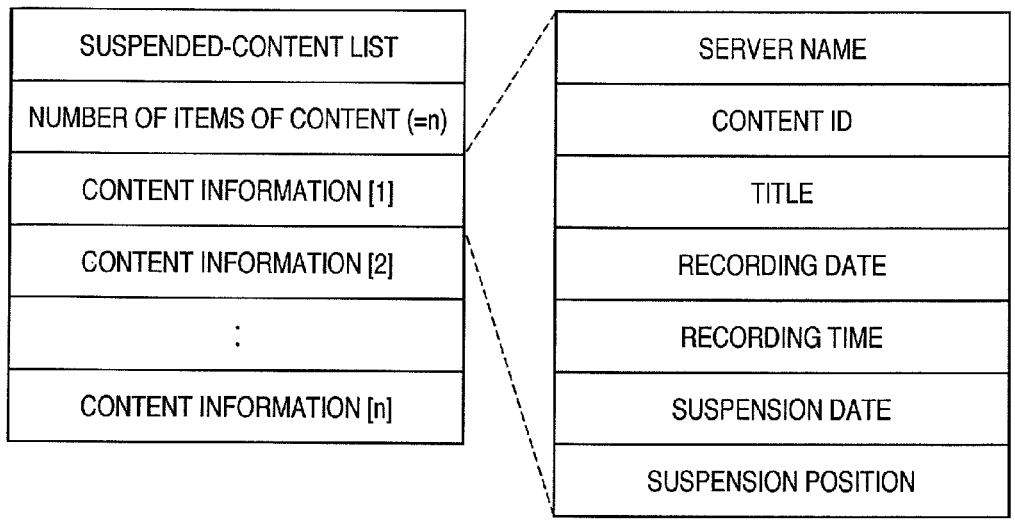

FIG. 6E illustrates an example of the suspended-content list command. This command is composed of a command code indicative of the suspended-content list command; number of items of content information contained in the command; and content information corresponding to the number of items of content information. Each item of content information is composed of name of the server storing the content; content ID for identifying content; content title; recording date; recording time; date on which playback was suspended; and location at which playback was suspended.

Figure 6F:
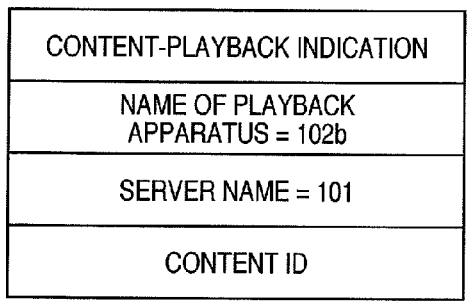

Next, the playback apparatus 102b, which has received the content-list command and the suspended-content list command from the server apparatus 101 and playback apparatus 102a, respectively, selects content desired to be played back from the content list that has been received. Here the playback apparatus 102b selects content contained in the suspended-content list received from the playback apparatus 102a and sends the playback apparatus 102a a content-playback indication command for indicating content playback (510). FIG. 6F illustrates an example of the content-playback indication command. This command is composed of a command code indicative of content-playback indication; name of the playback apparatus that will play back the content; name of the server storing the content; and content ID for identifying the content.

Figure 6G:
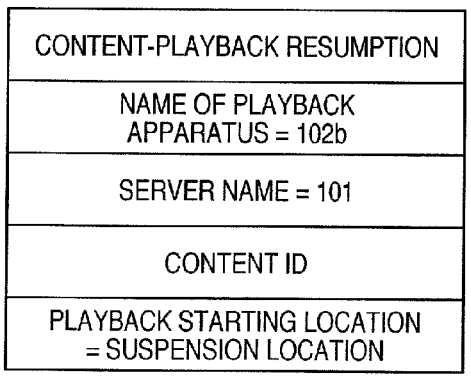

Upon receiving the content-playback indication command, the playback apparatus 102a specifies the content that will be played back from the suspended-content list 701, which has been stored in the flash memory 405, based upon the server name and content ID contained in the command. The playback apparatus 102a then sends the server apparatus 101 a content-playback resumption command (511) requesting resumption of content playback. FIG. 6G illustrates an example of the content-playback resumption command. This command is composed of a command code indicative of resumption of content playback; name of the playback apparatus that will play back the content; name of the server storing the content; content ID for identifying the content; and location at which content playback was suspended.

It should be noted that the playback apparatus 102b, which is the source of the request for content playback, and not the playback apparatus 102a that transmits the command, is stored in the field for the name of the playback apparatus within the command illustrated in FIG. 6G.

The server apparatus 101 that has received the content-playback resumption command from the playback apparatus 102a plays back the specified content from the specified location using the playback apparatus 102b (512).

Described next with reference to FIG. 8 will be operation of the playback apparatus 102a from requesting of a content list by the playback apparatus 102a to the indication of suspension of content playback (i.e., steps 501 to 506 in FIG. 5) in accordance with the above-described sequence.

Figure 8:
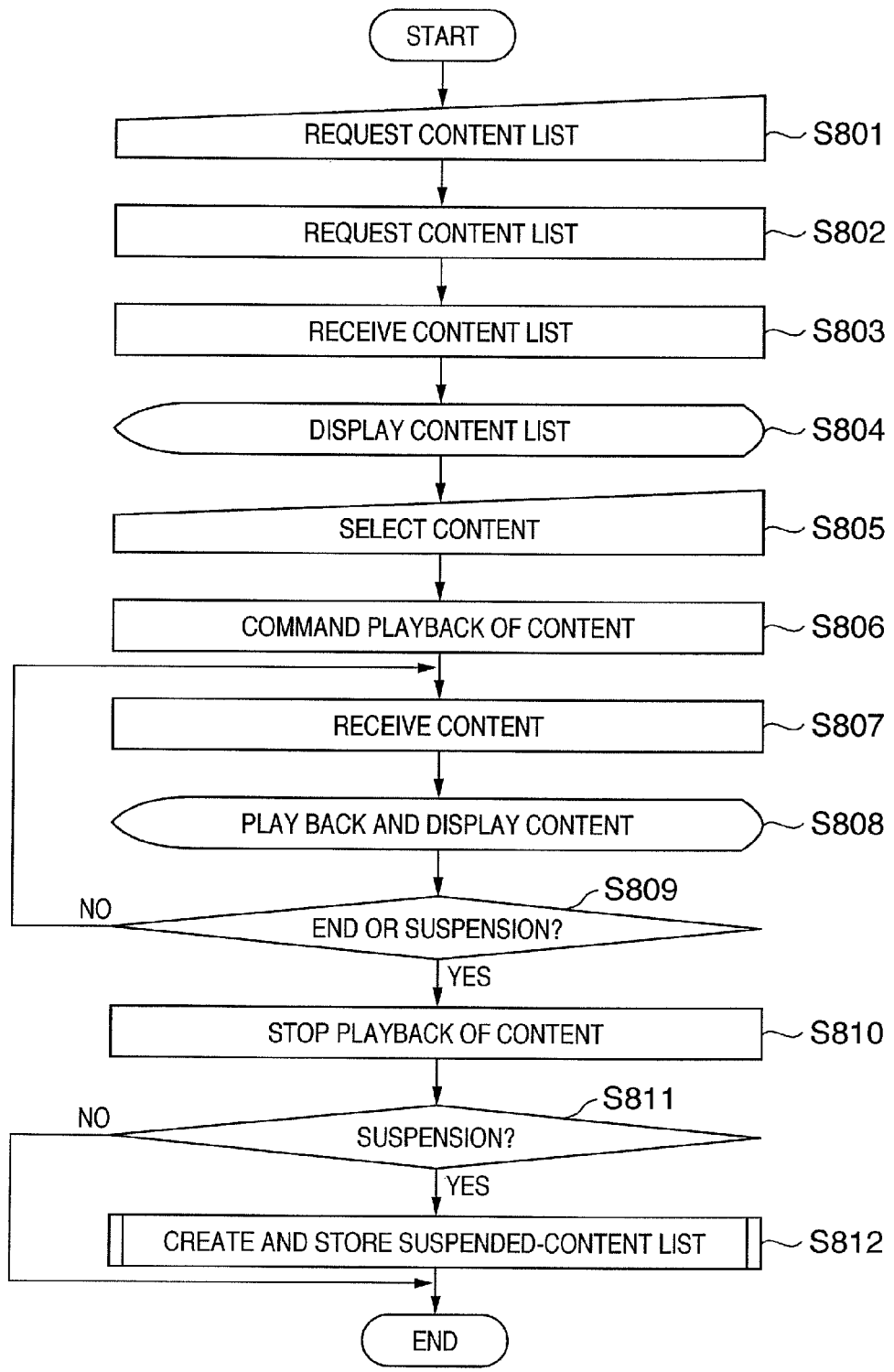
FIG. 8 is a flowchart illustrating the operation of a playback apparatus in the first embodiment.

FIG. 8 is a flowchart illustrating the operation of a playback apparatus 102a in the first embodiment. It should be noted that this operation is executed by the CPU 401 in accordance with the program that has been stored in the ROM 402 of the playback apparatus 102.

First, at step S801, when the content list is requested by a user operation at the console 407, control proceeds to step S802, where the content list is requested of each apparatus connected to the network line via the network controller 406. In this example, the request for the content list is issued to the server apparatus 101 and playback apparatus 102b. Next, at step S803, the content list is received from the server apparatus 101, whereupon control proceeds to step S804. Here the content list received is displayed on the display unit 404. Then, at step S805, content desired to be played back is selected by user operation from the displayed content list, whereupon control proceeds to step S806. Here the server apparatus 101 storing the selected content is instructed to play back this content.

Next, at step S807, when the content played back is received from the server apparatus 101, control proceeds to step S808, where the content is played back and displayed on the display unit 404. Then, at step S809, it is determined whether end or suspension of content playback has been specified. If this has not been specified, control returns to step S807, at which the above-described receipt, playback and display of content are repeated.

Further, if end or suspension of content playback by user operation has been specified at step S809, control proceeds to step S810, at which the server apparatus 101 is requested to stop content playback. Then, at step S811, it is determined whether suspension has been specified. If suspension has been specified, control proceeds to step S812. Here the suspended-content list relating to the content that was being played back and displayed is stored in the flash memory 405 and processing is exited. Further, if end has been specified at step S811, then processing is exited directly.

The creation and storage of the suspended-content list at step S812 will now be described in detail.

Figure 9:
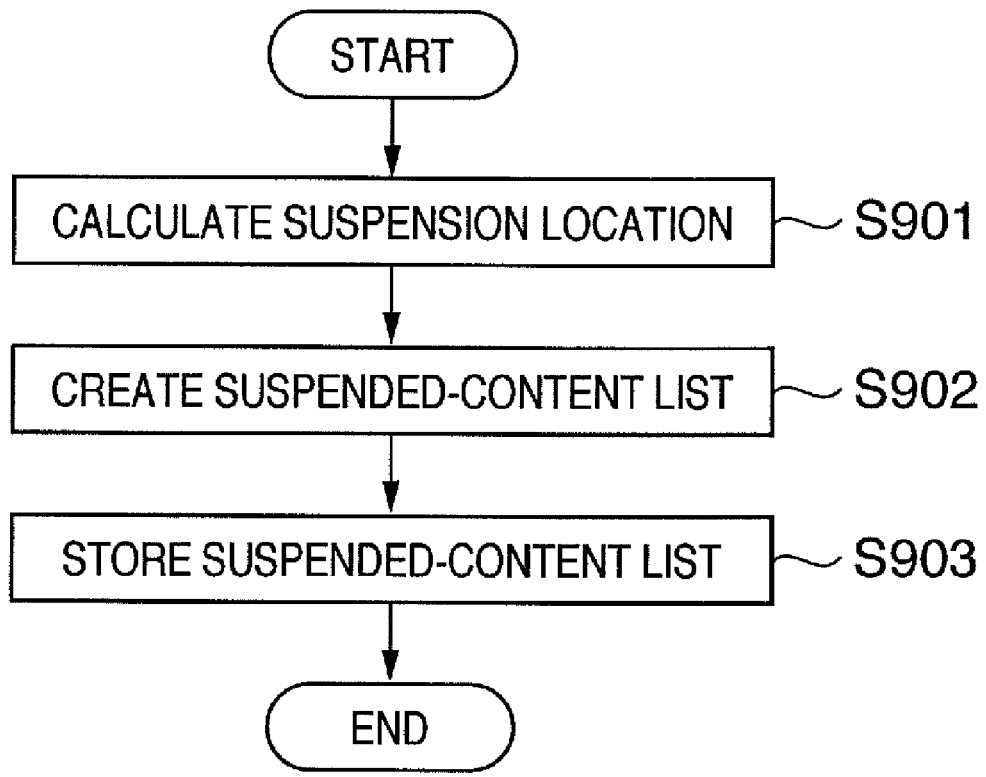
FIG. 9 is a flowchart illustrating the details of an operation for creating and storing the suspended-content list.

FIG. 9 is a flowchart illustrating the details of an operation for creating and storing the suspended-content list. First, at step S901, the location at which playback of content was suspended is calculated. In calculation of the suspension position, it is permissible to calculate time information, which is the position at which playback was suspended in terms of hour, minute and second; data-quantity information indicating how many bytes of data have been played back until suspension; and frame information indicating how many frames of video have been played back until suspension. In the first embodiment, however, the time information is calculated. Next, at step S902, a suspended-content list corresponding to this content is created based upon the time information calculated. Then, at step S903, the suspended-content list that has been created is stored in the flash memory 405.

As illustrated in FIG. 7, server name, content ID, title, recording date, recording time, time of suspension and location of suspension are stored in the flash memory 405 as the suspended-content list 701. Further, in the example shown in FIG. 7, the list is one containing two items of content.

Next, the operation of the server apparatus 101 will be described in accordance with the foregoing sequence (FIG. 5) with reference to FIG. 10.

Figure 10:
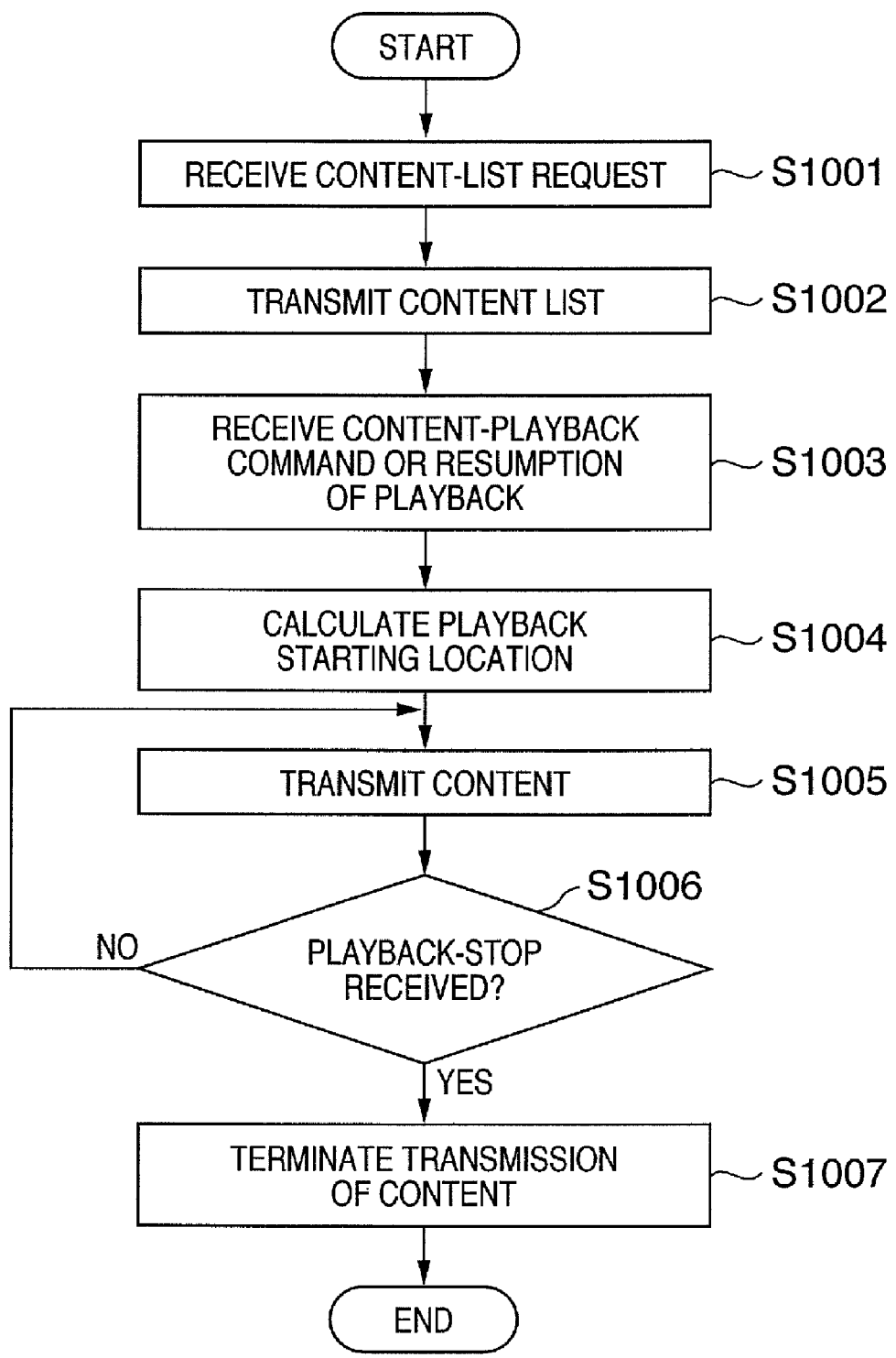
FIG. 10 is a flowchart illustrating the operation of the server apparatus according to the first embodiment.

FIG. 10 is a flowchart illustrating the operation of the server apparatus 101 according to the first embodiment. It should be noted that this operation is executed by the CPU 201 in accordance with a program that has been stored in the ROM 202 of the server apparatus 101.

First, at step S1001, a content-list request is received from the playback apparatus 102a. As a result, at step S1002, the server apparatus 101 reads out the content list 301 stored in the hard disk 204 and transmits the content list to the playback apparatus 102a, which is the source of the request. Then, at step S1003, when a content-playback indication or content-playback resumption command is received from the playback apparatus 102a, control proceeds to step S1004, where the server apparatus 101 reads the content data out of the hard disk 204 and calculates the starting location of content transmission.

If the command received is the content-playback indication, then the playback starting location is the beginning of the content data. If the command received is the content-playback resumption indication, then the suspension location contained in the command is the playback starting location.

Next, at step S1005, the server apparatus 101 transmits the content starting from the playback starting location determined at step S1004. Until a content-playback stop request is received at step S1006, control returns to step S1005 so that transmission of content data is repeated. When the stop request is received, control proceeds to step S1007, at which the server apparatus 101 terminates the transmission of content data and exits processing.

Figure 11:
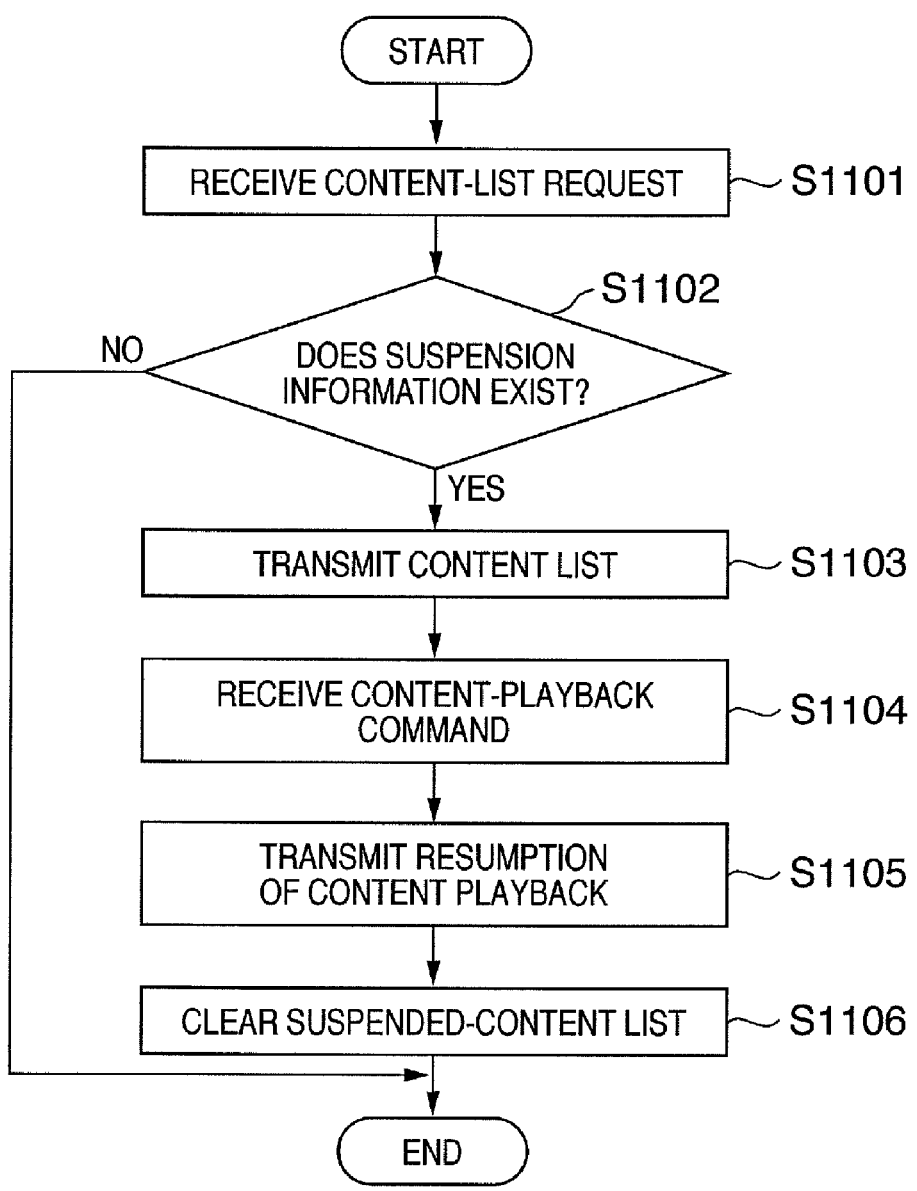
FIG. 11 is a flowchart illustrating operation after a playback apparatus issues a command to suspend content playback in the first embodiment.

Next, reference will be had to FIG. 11 to describe operation in accordance with the above-described sequence (FIG. 5) after the playback apparatus 102a has specified suspension of content playback. Here the playback apparatus 102a receives a content-list request from the playback apparatus 102b and transfers a content-playback indication from the playback apparatus 102b to the server apparatus 101 (steps 507 to 511 in FIG. 5).

First, at step S1101, when a content-list request is received from the playback apparatus 102b, control proceeds to step S1102, at which it is determined whether the suspended-content list 701 has been stored in the flash memory 405. If the suspended-content list 701 has not been stored, control proceeds to step S1103, where the suspended-content list is transmitted to the playback apparatus 102b, which is the source of the request.

Next, at step S1104, an indication of resumption of playback of content within the list is received. Then, at step S1105, the content-playback resumption command is transmitted to the server 101 at which the content has been stored. This is followed by step S1106, at which the information relating to the content is cleared from within the suspended-content list 701 and processing is exited.

Figure 12:
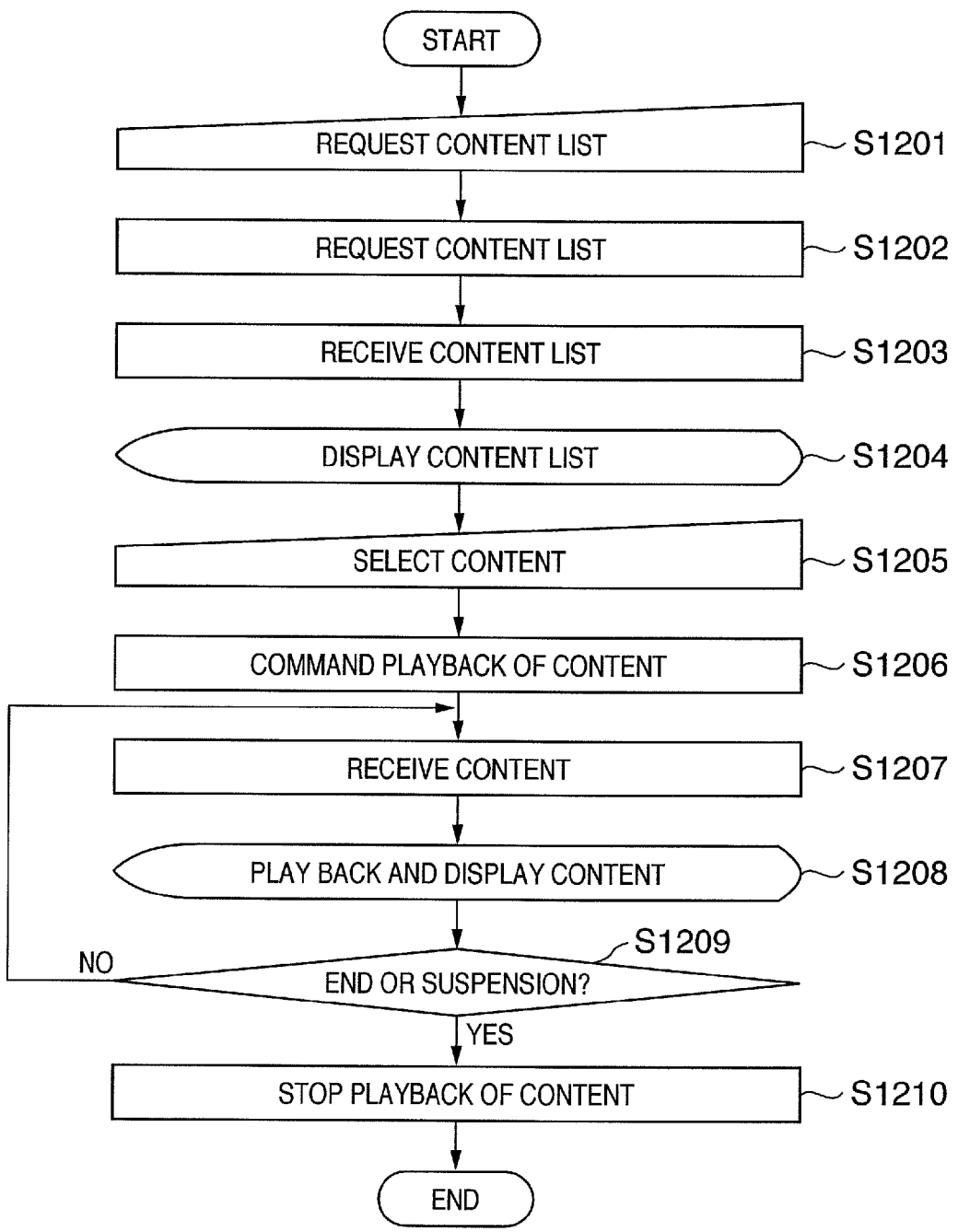
FIG. 12 is a flowchart illustrating the operation of a playback apparatus according to the first embodiment.

Next, reference will be had to FIG. 12 to describe the operation of the playback apparatus 102b in accordance with the above-described sequence (FIG. 5).

First, if a content-list request is issued by user operation at the console 407 at step S1201, control proceeds to step S1202. Here the content-list request is issued to each apparatus connected to the network line via the network controller 406. In this example, the request for the content list is issued to the server apparatus 101 and playback apparatus 102a. Next, at step S1203, the content list is received from the server apparatus 101 and playback apparatus 102a, whereupon control proceeds to step S1204. Here the content list received is displayed on the display unit 404. Then, at step S1205, content desired to be played back is selected by user operation from the displayed content list, whereupon control proceeds to step S1206. Here the transmission source of the content-list command is instructed to play back the content.

More specifically, if the content selected by the user is content in the content list received from the server apparatus 101, the content-playback indication command is transmitted to the server apparatus 101. Further, if the content selected by the user is content in the suspended-content list received from the playback apparatus 102a, then the content-playback indication command is transmitted to the playback apparatus 102a. The first embodiment is an example of a case where the content-playback indication command is transmitted to the playback apparatus 102a.

Next, at step S1207, when the content data is received from the server apparatus 101 that is the server of the content, control proceeds to step S1208, where the content is played back and displayed on the display unit 404. Then, at step S1209, it is determined whether end or suspension of content playback has been specified. If this has not been specified, control returns to step S1207, at which the above-described receipt, playback and display of content are repeated.

Further, if end or suspension of content playback by user operation has been specified at step S1209, control proceeds to step S1210, at which the server apparatus 101 is requested to stop content playback. Processing is then exited.

As described above, the first embodiment is such that when playback of content is resumed, the playback apparatus that specified suspension of content playback presents another playback apparatus with information that is for the purpose of selecting the content whose playback was suspended. This other playback apparatus then resumes playback of the content with respect to the playback apparatus that specified suspension of playback, and the playback apparatus that specified suspension of playback requests the server apparatus for resumption of content playback. The server apparatus transmits content to the playback apparatus that requested resumption of playback, thereby making it possible for playback to be resumed by a playback apparatus different from the playback apparatus that suspended content playback.

Second Embodiment

A second embodiment of the present invention will now be described in detail with reference to the drawings. The second embodiment will be described with regard to a case where after a suspended-content list has been transmitted to the playback apparatus 102b, the playback apparatus 102b and not the playback apparatus 102a instructs the server apparatus 101 to play back content.

Figure 13:
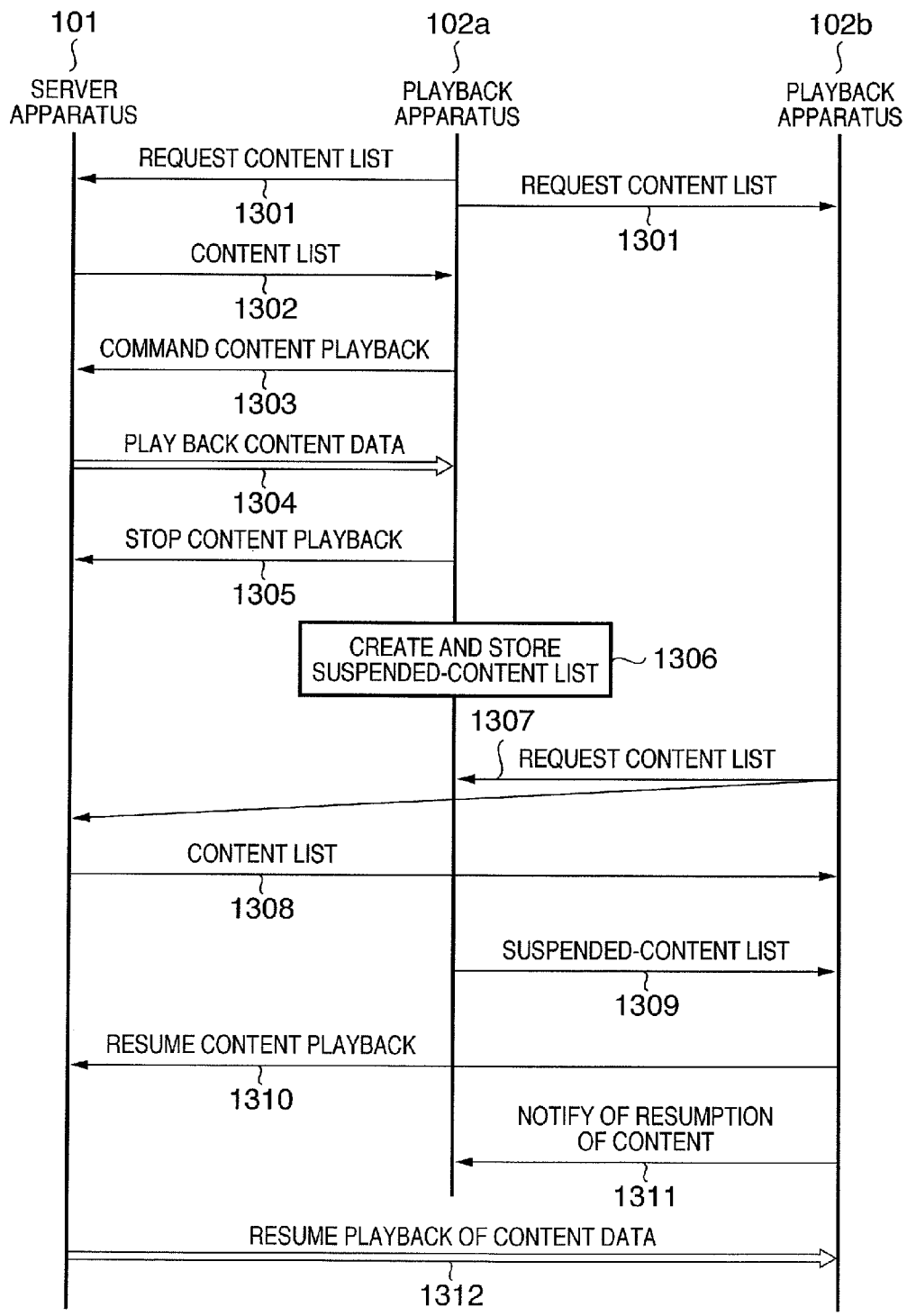
FIG. 13 is a diagram illustrating a sequence in a second embodiment in which playback of content is suspended and then playback is subsequently resumed by another playback apparatus.

FIG. 13 is a diagram illustrating a sequence in the second embodiment in which playback of content is suspended and then playback is subsequently resumed by another playback apparatus. The sequence from the content-list request (1301) to transmission (1309) of the suspended-content list shown in FIG. 13 is a sequence similar to that of the first embodiment illustrated in FIG. 5 and need not be described again.

Upon receiving the suspended-content list, the playback apparatus 102b refers to the server-name field contained in the suspended-content list and requests the server apparatus 101, which is the source storing the content of interest, to resume playback of the content (1310). The composition of the content-playback resumption command is similar to that shown in FIG. 6G.

Further, the playback apparatus 102b issues content resumption notification (1311) for notifying of the fact that the server apparatus 101 has been directly requested to resume playback of the content contained in the suspended-content list received from the playback apparatus 102a. On the other hand, the server apparatus 101 that has received the request for resumption of content playback resumes transmission of the content data to the playback apparatus 102b that was the source of the request (1312).

Figure 14:
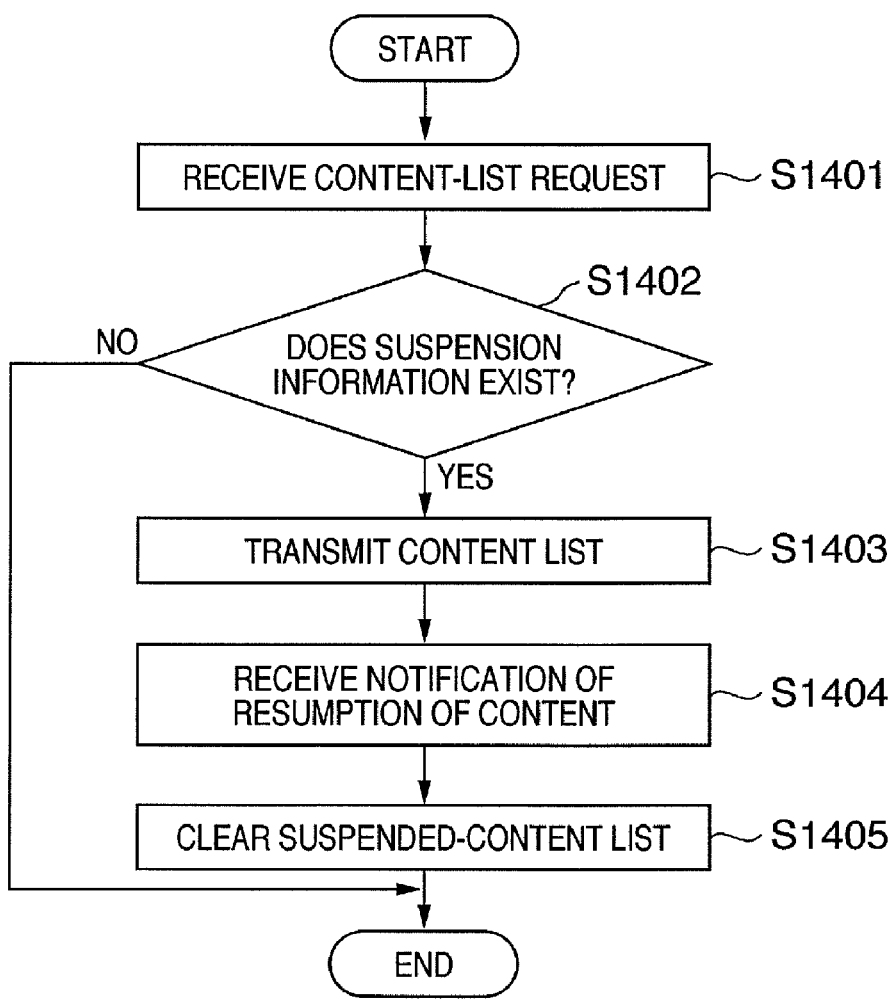
FIG. 14 is a flowchart illustrating operation after a playback apparatus issues a command to suspend content playback in the second embodiment.

Next, reference will be had to FIG. 14 to describe operation in accordance with the above-described sequence (FIG. 13) after the playback apparatus 102a has specified suspension of content playback.

First, at step S1401, when a content-list request is received from the playback apparatus 102b, control proceeds to step S1402, at which it is determined whether the suspended-content list 701 has been stored in the flash memory 405. If the suspended-content list 701 has not been stored, control proceeds to step S1403, where the suspended-content list is transmitted to the playback apparatus 102b, which is the source of the request.

Next, at step S1404, notification of resumption of playback of content within the list is received. Then, at step S1405, information relating to the content is cleared from the suspended-content list 701 and processing is exited.

Next, reference will be had to FIG. 15 to describe the operation of the playback apparatus 102b in accordance with the above-described sequence (FIG. 13).

FIG. 15 is a flowchart illustrating the operation of the playback apparatus 102b according to the second embodiment. It should be noted that operation from step S1501 to step S1505 is similar to that of step S1201 to step S1205 in FIG. 12 and need not be described again.

At step S1506, the server apparatus 101, which is the storage source of content that has been selected by the user at step S1505, is instructed to play back the content. Here the server-name fields of the content list [in FIGS. 6B and 6E] represent the server apparatus, which is the storage source of this content, and therefore this server apparatus is instructed to perform playback. This embodiment differs from the first embodiment in that the server apparatus storing the content is instructed to play back the content and not the source of transmission of the content list.

Next, if it is found at step S1507 that the content whose playback has been specified is content in the suspended-content list, control proceeds to step S1508, where the source of transmission of the suspended-content list is notified of the fact that playback of content has resumed.

Next, if content data is received from the server apparatus 101, which is the server of the content, at step S1509, control proceeds to step S1510, where this content is played back and displayed on the display unit 404. Then, at step S1511, it is determined whether end or suspension of content playback has been specified. If this has not been specified, control returns to step S1509, at which the above-described receipt, playback and display of content are repeated.

Further, if end or suspension of content playback by user operation has been specified at step S1511, control proceeds to step S1512, at which the server apparatus 101 is requested to stop content playback. Processing is then exited.

As described above, the second embodiment is such that when playback of content is resumed, the playback apparatus that specified suspension of content playback presents another playback apparatus with information that is for the purpose of selecting the content whose playback was suspended. This other playback apparatus then requests the server apparatus to resume playback of this content, thereby making it possible for playback to be resumed by a playback apparatus different from the playback apparatus that suspended content playback.

It should be noted that the present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media for supplying the program are a Floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

Furthermore, besides the case where the aforethe functions are implemented by executing the program codes read by a computer, it goes without saying that the present invention also covers a case where an operating system or the like running on the computer performs a part of or the entire actual process based upon the designation of program codes and implements the functions of the embodiments by this processing.

Furthermore, it goes without saying that the invention also covers a case where the program code read from the recording medium is written to a memory provided on a function expansion board inserted into the computer or provided in a function expansion unit connected to the computer, after which a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-249946, filed Aug. 30, 2005, which is hereby incorporated by reference herein in its entirety.

What is claimed is:

1. A content playback method in a system in which a server apparatus for storing content and first and second playback apparatuses for playing back the content that has been stored in the server apparatus are connected via a network, the method comprising the steps of:

storing, in a storage unit of the first playback apparatus, at least (a) identification information for identifying suspended content for which content playback has been suspending in the first playback apparatus and (b) suspension information indicating a suspension position at which the content playback has been suspended after the first playback apparatus instructs the server apparatus to stop the content playback;

presenting the identification information to the second playback apparatus from the first playback apparatus, in response to a request of content playback from the second playback apparatus;

instructing, from the first playback apparatus, the server apparatus to resume content playback for the second playback apparatus from a suspension position of content, in response to an instruction of the content playback from the second playback apparatus, wherein the content to be resumed is selected by the second playback apparatus from the suspended content identified by the identification information presented in the presenting step; and resuming the content playback by the server apparatus for the second playback apparatus of the content from the suspension position instructed in the instructing step by directly transmitting to the second playback apparatus without transmission via the first playback apparatus.

2. The method according to claim 1, further comprising the steps of:

erasing the identification information and the suspension information stored in the storage unit after the instruction in the instructing step.

3. A playback apparatus in a system in which a server apparatus for storing content and a plurality of playback apparatuses for playing back the content that has been stored in the server apparatus are connected via a network, the playback apparatus comprising:

a suspension-information storage unit adapted to store, in a storage unit of the playback apparatus, at least (a) identification information for identifying suspended content for which content playback has been suspended in the playback apparatus and (b) suspension information indicating a suspension position at which the content playback has been suspended after instructing stopping of the content playback;

a suspension-information presenting unit adapted to present the identification information to another playback apparatus in response to a request of content playback from the another playback apparatus; and an instruction unit adapted to instruct the server apparatus to resume content playback for the another playback apparatus from a suspension position of content, in response to an instruction of the content playback from the another playback apparatus, wherein the content to be resumed is selected by the another playback apparatus from the suspended content identified by the identification information presented by the suspension-information presenting unit and is to be transmitted from the server apparatus directly to the another playback apparatus without transmission via the playback apparatus.

4. The playback apparatus according to claim 3, further comprising:

an erasing unit adapted to erase the identification information and the suspension information stored in the storage unit after the instruction by the instruction unit.

5. A playback apparatus in a system in which a server apparatus for storing content and a plurality of playback apparatuses for playing back the content that has been stored in the server apparatus are connected via a network, the playback apparatus comprising:

a playback requesting unit adapted to request content playback of content;

a suspension-information receiving unit adapted to receive, from another playback apparatus, at least identification information for identifying suspended content for which the content playback has been suspended in the another playback apparatus, in response to the request by the playback requesting unit;

a selecting unit adapted to select the content so that content playback is resumed from the suspended content identified by the identification information received by the suspension-information receiving unit;

an instruction unit adapted to instruct the another playback apparatus to resume the content playback of the content selected by the selecting unit; and a playback unit adapted to play back the content resumed in response to the instruction by the instruction unit from a suspension position at which the content playback has been suspended, wherein the content is transmitted from the server apparatus directly to the playback apparatus without transmission via the another playback apparatus.

6. A non-transitory computer-readable recording medium on which has been recorded a program for causing a computer to function as the playback apparatus according to claim 3.

7. A non-transitory computer-readable recording medium on which has been recorded a program for causing a computer to function as the playback apparatus according to claim 5.

8. A content playback method of a playback apparatus in a system in which a server apparatus for storing content and a plurality of playback apparatuses for playing back the content that has been stored in the server apparatus are connected via a network, the content playback method comprising:

storing, in a storage unit of the playback apparatus, at least (a) identification information for identifying suspended content for which content playback has been suspended in the playback apparatus and (b) suspension information indicating a suspension position at which the content playback has been suspended after instructing stopping of the content playback;

presenting the identification information to another playback apparatus in response to a request of content playback from the another playback apparatus; and instructing the server apparatus to resume content playback for the another playback apparatus from a suspension position of content, in response to an instruction of the content playback from the another playback apparatus, wherein the content to be resumed is selected by the another playback apparatus from the suspended content identified by the identification information presented in the presenting step and is to be transmitted from the server apparatus directly to the another playback apparatus without transmission via the playback apparatus.

9. A content playback method of a playback apparatus in a system in which a server apparatus for storing content and a plurality of playback apparatuses for playing back the content that has been stored in the server apparatus are connected via a network, the content playback method comprising:

requesting content playback of content;

receiving, from another playback apparatus, at least identification information for identifying suspended content for which the content playback has been suspended in the another playback apparatus, in response to the request in the requesting step;

selecting content so that content playback is resumed from the suspended content identified by identification information received in the receiving step;

instructing the another playback apparatus to resume the content playback of the content selected in the selecting step; and playing back the content resumed in response to the instruction in the instructing step from a suspension position at which the content playback has been suspended, wherein the content is transmitted from the server apparatus directly to the playback apparatus without transmission via the another playback apparatus.

* * * * *